US010082800B2

(12) United States Patent
Moon

(10) Patent No.: US 10,082,800 B2
(45) Date of Patent: Sep. 25, 2018

(54) METHOD FOR STABILIZING MISSION EQUIPMENT USING UNMANNED AERIAL VEHICLE COMMAND AND POSTURE INFORMATION

(71) Applicant: KOREAN AIR LINES CO., LTD., Seoul (KR)

(72) Inventor: Jung Ho Moon, Daejeon (KR)

(73) Assignee: KOREAN AIR LINES CO., LTD., Seoul (KR)

( * ) Notice: Subject to any disclaimer, the term of this patent is extended or adjusted under 35 U.S.C. 154(b) by 0 days.

(21) Appl. No.: 15/542,416

(22) PCT Filed: Jan. 11, 2016

(86) PCT No.: PCT/KR2016/000213
§ 371 (c)(1),
(2) Date: Sep. 20, 2017

(87) PCT Pub. No.: WO2016/111594
PCT Pub. Date: Jul. 14, 2016

(65) Prior Publication Data
US 2018/0088594 A1 Mar. 29, 2018

(30) Foreign Application Priority Data

Jan. 9, 2015 (KR) ........................ 10-2015-0003356

(51) Int. Cl.
*G05D 1/00* (2006.01)
*G05D 1/08* (2006.01)
*B64C 39/02* (2006.01)

(52) U.S. Cl.
CPC ......... *G05D 1/0816* (2013.01); *B64C 39/024* (2013.01); *B64C 2201/141* (2013.01)

(58) Field of Classification Search
CPC ................ G05D 1/0816; B64C 39/024; B64C 2201/141
(Continued)

(56) References Cited

U.S. PATENT DOCUMENTS

| 8,229,163 | B2 * | 7/2012 | Coleman | ............ | G06K 9/00208 |
| | | | | | 382/103 |
| 2009/0087029 | A1 * | 4/2009 | Coleman | ............ | G06K 9/00208 |
| | | | | | 382/103 |

(Continued)

FOREIGN PATENT DOCUMENTS

| KR | 10-2008-0026382 A | 3/2008 |
| KR | 10-2010-0016915 A | 2/2010 |

(Continued)

*Primary Examiner* — Shardul D Patel
(74) *Attorney, Agent, or Firm* — Rabin & Berdo, P.C.

(57) ABSTRACT

A method of stabilizing mission equipment by a mission equipment stabilization system using an unmanned aerial system command and posture information, includes, receiving and transmitting a roll or pitch posture command signal to an autopilot control loop and a posture prediction unit; transmitting a command signal to a control surface so that the aerial system follows the command signal; receiving the posture command signal, filtering a posture prediction through angular velocity limitation and time-delayed filtering, simulating/predicting a response from the autopilot control loop, and outputting a posture prediction signal; converting the posture prediction signal predicted by the posture prediction unit into an azimuth command signal; differentiating the azimuth command signal into an angular velocity command signal; removing noise from the differentiated angular velocity command signal; and receiving the angular velocity command signal and stably doing a mission.

3 Claims, 2 Drawing Sheets

(58) Field of Classification Search
USPC ............ 701/11, 41, 70; 244/17.13; 382/103
See application file for complete search history.

(56) References Cited

U.S. PATENT DOCUMENTS

2013/0327880 A1* 12/2013 Certain .................. B64C 13/18
                  244/17.13
2017/0160749 A1* 6/2017 Torralba .................. B64C 13/18

FOREIGN PATENT DOCUMENTS

| KR | 10-2011-0134076 A | 12/2011 |
| KR | 10-1160454 B | 6/2012 |
| WO | WO-2014-119825 | 8/2014 |

* cited by examiner

METHOD FOR STABILIZING MISSION EQUIPMENT USING UNMANNED AERIAL VEHICLE COMMAND AND POSTURE INFORMATION

TECHNICAL FIELD

The present invention relates a method of stabilizing mission equipment using an unmanned aerial system command and posture information, and more particularly to a method of stabilizing mission equipment using an unmanned aerial system command and posture information, in which a posture command and information of an unmanned aerial system are input to the mission equipment to thereby improve stabilization performance.

BACKGROUND ART

In a conventional unmanned aerial system, mission equipment operates independently of an aerial system and is internally provided with an angular velocity sensor for stabilization control so that a sensed angular velocity can be fed back to the aerial system and thus a camera can be prevented from unstable movement while the aerial system flies.

However, the mission equipment has problems that it is very expensive, is slow to respond to a sudden maneuver of the aerial system and shows stabilization performance varied depending on flight characteristics.

PRIOR ART

Patent Document

Korean Patent No. 10-1160454 (2012.06.21)

DISCLOSURE

Technical Problem

Accordingly, the present invention is conceived to solve the foregoing problems, and an object of the present invention is to provide a method of stabilizing mission equipment using an unmanned aerial system command and posture information, with a system including a posture prediction filter of taking characteristics of an autopilot control loop into account with respect to a posture command, an Euler coordinate transformation unit for converting a predicted posture into an azimuth (or elevation) command of the mission equipment, a differentiation filter for obtaining an angular velocity value by differentiating a posture, and a unit for delivering calculated command information to a mission equipment processor.

Technical Solution

In accordance with one aspect of the present invention, there is provided a method of stabilizing mission equipment using an unmanned aerial system command and posture information, the method comprising the steps of: (a) by an input unit 100 of the mission equipment stabilization system, receiving and transmitting a roll or pitch posture command signal to an autopilot control loop 200 and a posture prediction unit 300 of the mission equipment stabilization system; (b) by the autopilot control loop 200, transmitting a command signal to a control surface so that the aerial system follows the command signal; (c) by the posture prediction unit 300, receiving the posture command signal, filtering a posture prediction through angular velocity limitation and time-delayed filtering, simulating/predicting a response from the autopilot control loop (200), and outputting a posture prediction signal; (d) by an Euler coordinate transformation unit 400, converting the posture prediction signal predicted by the posture prediction unit 200 into an azimuth command signal of the mission equipment; (e) by the differentiation filter 500, differentiating the azimuth command signal into an angular velocity command signal; (f) by the differentiation filter 500, removing noise from the differentiated angular velocity command signal; and (g) by the mission equipment 600, receiving the angular velocity command signal and stably doing a mission.

Advantageous Effects

According to the present invention, a method of stabilizing mission equipment using unmanned aerial system command and posture information has effects on stabilizing a high maneuver by grasping posture information of the aerial system, using the existing flight control software modified without additionally mounting specific hardware, and allowing mission equipment having no stabilization function to do stabilization by interworking between a global positioning system (GPS)/internal navigation system (INS) using a gyroscope having a relatively high performance and a mission equipment stabilization loop.

BEST MODE

Figure 1:
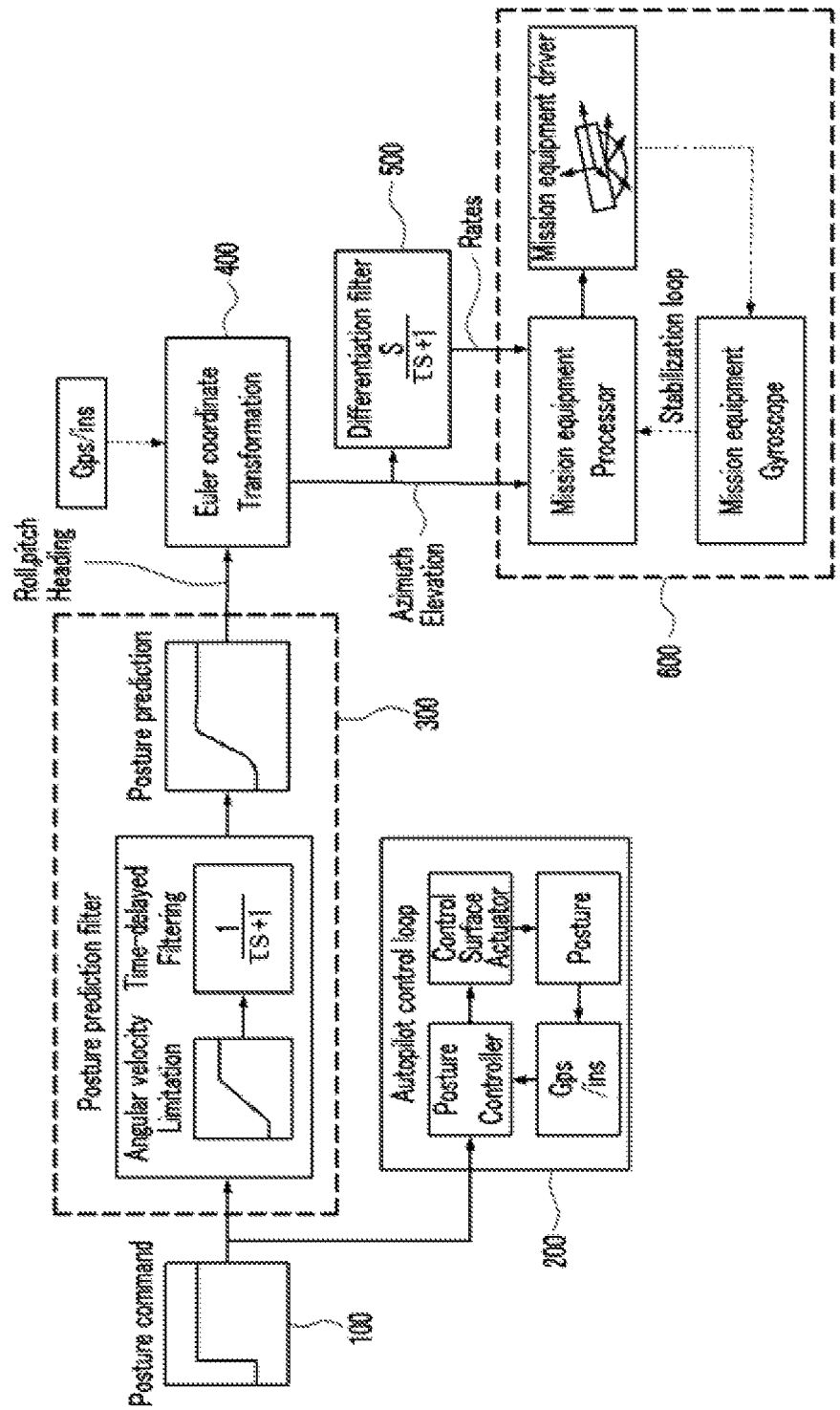
FIG. 1 is a block diagram of a mission equipment stabilization system using an unmanned aerial system command and posture information according to the present invention.

Below, embodiments of the present invention will be described in detail with reference to accompanying drawings. In the following description, terms or words used in the specification and claims are construed as not typical or lexical meaning but meaning and concept corresponding to the idea of the present invention on the principle that the inventor can properly define the concept of the terms in order to explain his/her own invention for the best.

Therefore, it has to be understood that various equivalents and alternatives can be made at the time of filing the present invention since the descriptions of the specification and the features shown in the drawings are no other than preferred embodiments without reflecting all the technical ideas of the present invention.

Below, a method of stabilizing mission equipment using an unmanned aerial system command and posture information according to the present invention will be described with reference to accompanying drawings.

FIG. 1 is a block diagram for describing a method of stabilizing mission equipment using an unmanned aerial system command and posture information according to the present invention.

As shown in FIG. 1, to materialize the method of stabilizing the mission equipment using the unmanned aerial system command and the posture information, there are provided an input unit 100, an autopilot control loop 200, a posture prediction unit 300, an Euler coordinate transformation unit 400, a differentiation filter 500 and mission equipment 600.

With these elements, a stabilization method by a mission equipment stabilization system using the unmanned aerial system command and the posture information according to the present invention will be described.

The input unit 100 receives a posture command signal, i.e. a roll or pitch posture command signal for an actual unmanned aerial system from the ground, and transmits the posture command signal to the autopilot control loop 200 and the posture prediction unit 300 (S100).

The autopilot control loop 300 includes a posture controller, a control surface actuator, an aerial system, and a global positioning system (GPS)/inertial navigation system (INS). The posture controller transmits the command signal to the control surface actuator so that the aerial system can follow a command of the command signal (S200).

In addition, the GPS/INS in the autopilot control loop feeds the angular velocity and posture information received in the stage S200 back to the posture controller, thereby further achieving a function of stabilizing the posture.

The posture prediction unit 300 receives the posture command signal and filters a posture prediction through angular velocity limitation and the time-delayed filtering, thereby simulating/predicting a response from the autopilot control loop 200 and outputting a posture prediction signal (S300).

Figure 2:
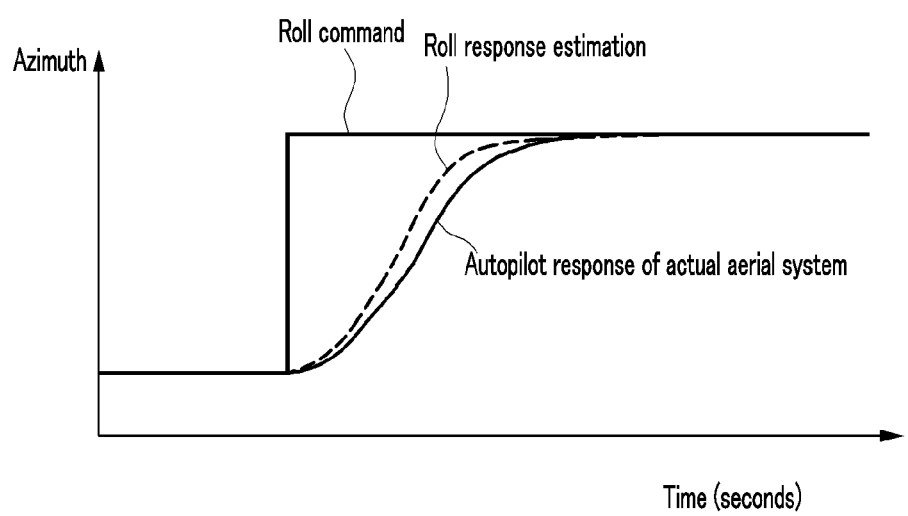
FIG. 2 is a roll-response estimation graph in the mission equipment stabilization system using the unmanned aerial system command and the posture information according to the present invention.

That is, as shown in FIG. 2, a roll command received in the input unit 100 is input to the posture prediction unit 200, and a roll response similar to a roll response of an actual aerial system is thus predicted and output.

For reference, FIG. 2 is a roll-response estimation graph in the mission equipment stabilization system using the unmanned aerial system command and the posture information according to the present invention The Euler coordinate transformation unit 400 converts the posture prediction signal predicted in the posture prediction unit 200 into an azimuth (or elevation) command signal for the mission equipment (S400).

The differentiation filter 500 interposed in between the Euler coordinate transformation unit 400 and the mission equipment 600 obtains an angular velocity command signal value by differentiating a posture (S500).

Further, the differentiation filter 500 removes noise from the angular velocity value obtained by the differentiation (S600).

More specifically, the differentiation filter 500 operates as follows.

In general, a camera, i.e. the mission equipment 600 of the unmanned aerial system uses an angular velocity command mainly and uses a camera angle as necessary.

Therefore, the Euler coordinate transformation unit 400 has to differentiate a posture value obtained by the Euler transformation into an angular velocity value and then transmit the angular velocity value to the mission equipment 600.

At this time, noise is added when the differentiation filter 500 materialized by a low-frequency filter differentiates the posture value obtained by the Euler transformation, and therefore there is a need of removing the noise in order to get stable operation.

Thus, the mission equipment 600 is controlled by the posture value, from which the noise is removed, from the differentiation filter 500, thereby stably doing the mission (S700).

In case of an inexpensive unmanned aerial system with mission equipment having no stabilization function, the GPS/INS 700 mounted to the aerial system feeds the angular velocity and the posture information back to the mission equipment, thereby achieving the stabilization function.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

REFERENCE NUMERALS

100: input unit
200: autopilot control loop
300: posture prediction unit
400: Euler coordinate transformation unit
500: differentiation filter
600: mission equipment

The invention claimed is:

1. A method of stabilizing mission equipment by a mission equipment stabilization system using an unmanned aerial system command and posture information, the method comprising the steps of:
    (a) by an input unit 100 of the mission equipment stabilization system, receiving and transmitting a roll or pitch posture command signal to an autopilot control loop 200 and a posture prediction unit 300 of the mission equipment stabilization system;
    (b) by the autopilot control loop 200, transmitting a command signal to a control surface so that the aerial system follows the command signal;
    (c) by the posture prediction unit 300, receiving the posture command signal, filtering a posture prediction through angular velocity limitation and time-delayed filtering, simulating/predicting a response from the autopilot control loop (200), and outputting a posture prediction signal;
    (d) by an Euler coordinate transformation unit 400, converting the posture prediction signal predicted by the posture prediction unit 200 into an azimuth command signal of the mission equipment;
    (e) by the differentiation filter 500, differentiating the azimuth command signal into an angular velocity command signal; and
    (g) by the mission equipment 600, receiving the angular velocity command signal and stably doing a mission.

2. The method according to claim 1, further comprising the step of (f) by the differentiation filter 500, removing noise from the differentiated angular velocity command signal after the step of (e).

3. The method according to claim 1, further comprising the step of: doing a function of stabilizing a posture by feeding angular velocity and posture information internally transmitted from an internal global positioning system (GPS)/internal navigation system (INS) to the autopilot control loop 300 back to a posture controller.

* * * * *